June 1, 1965　　　　C. MAGEE　　　　3,186,420
SUPPORT FRAME
Filed May 10, 1963　　　　2 Sheets-Sheet 1
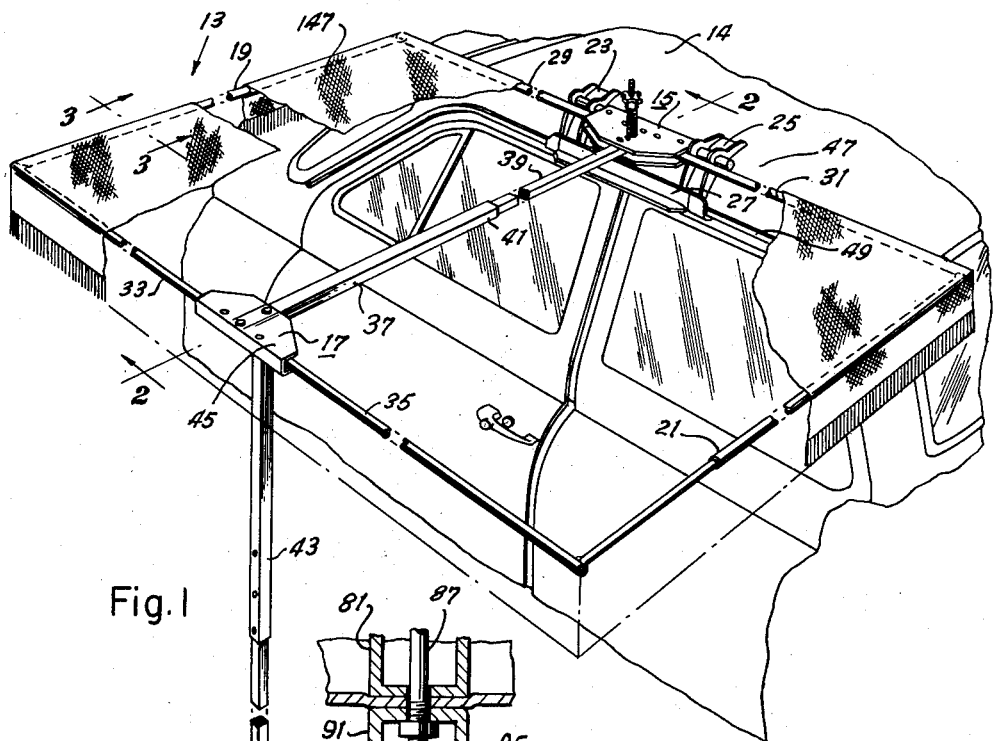
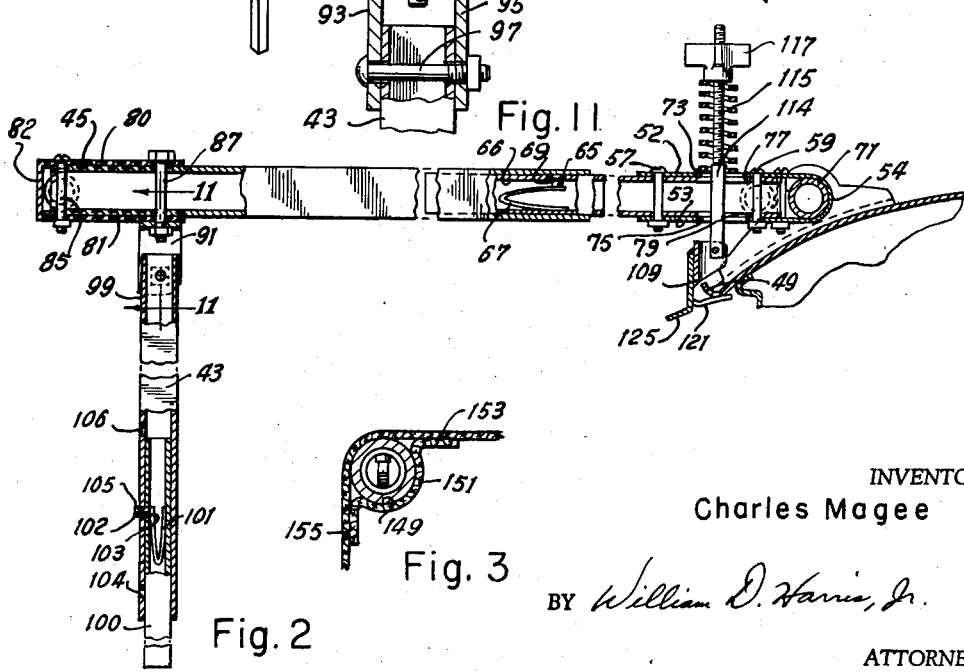
INVENTOR
Charles Magee
BY William D. Harris, Jr.
ATTORNEY

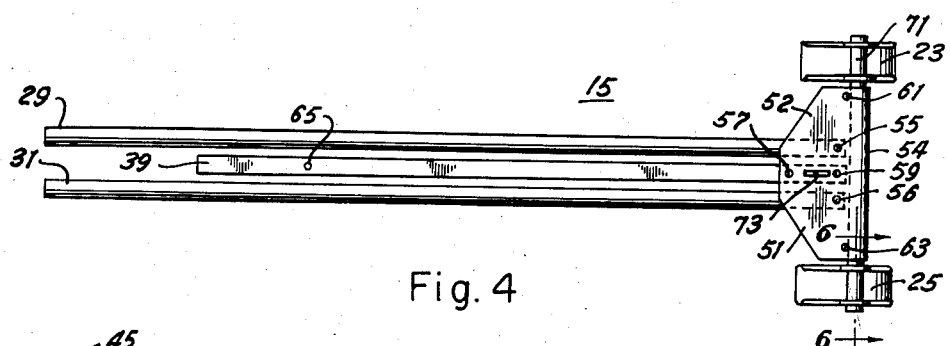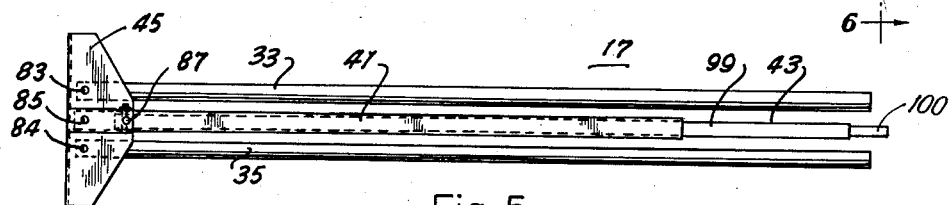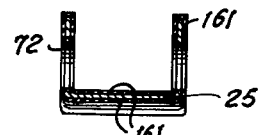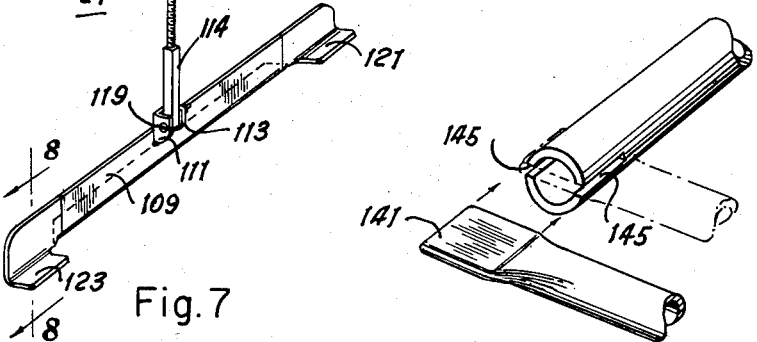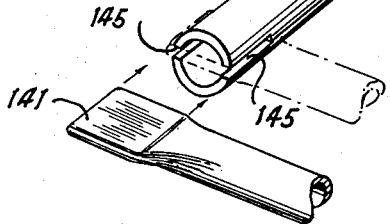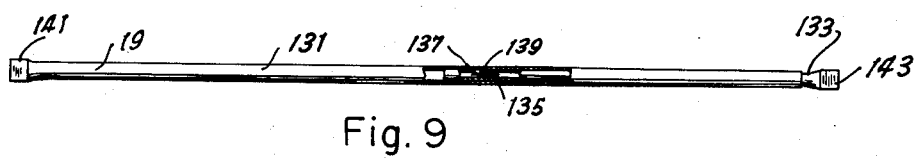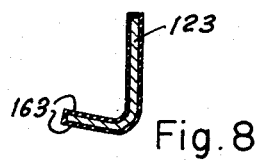

United States Patent Office 3,186,420
Patented June 1, 1965

3,186,420
SUPPORT FRAME
Charles Magee, 6731 Lakehurst, Dallas, Tex.
Filed May 10, 1963, Ser. No. 279,430
14 Claims. (Cl. 135—7.1)

This invention relates to support frames, particularly to a support frame which is adapted to engage an elevated structure, for example the upper portions of a vehicle, adjacent one side thereof and provided a support extending outwardly from said structure.

Supports extending from the upper side portions of a vehicle are useful to provide load bearing structure on which to carry a desired item, for example, a canopy or other means for protection from the sun and rain.

Various load bearing structures which are extendible from an automobile for such purposes are known in the art; however, they have certain of the following disadvantages: The attachment means with the automobile are complex and/or require at least two supports relatively widely spaced apart on the automobile; the attachment means with the automobile are prone to damage the surfaces thereof; the support frames are cumbersome and difficult to transport; the support frames do not positively engage the automobile to assure continued support when said means are subject to forces from relatively mild winds or inadvertent pushes from persons or animals thereabout; the support frames do not cooperate to hold the outer column support means downwardly against a load bearing surface, such as the ground.

It is the object of the instant invention to overcome those deficiencies noted just above; specifically, it is an object of the instant invention to provide disengageable support means which are adapted for simple, but secure engagement with the top side portions of an automobile by engagement with portions of said automobile which are relatively close together; to provide such support means that are engageable by means which do not tend to damage the surfaces of the automobile; to provide such means which are simply adjustable to fit a variety of automobiles; to provide such means which has a beam extending from the automobile which is forced downwardly to press its outer support column into engagement with the load bearing surface therebelow so that normal forces from winds and pushes can be resisted without disengaging the structure; to provide such means which are foldable into a compact carrying position; and to provide such means which may be simply and inexpensively made.

In a preferred embodiment of the instant invention, it is a specific object to provide support means which engage the top side portion of an automobile through resilient clamping means which are so configured and arranged that a support beam extending outwardly from the side of the automobile is normally biased downwardly. The arrangement and cooperation of parts insure that the support beam will be thrust downwardly to firmly engage a suitable column to provide outboard base support for the beam, while, at the same time, forcing the clamping means into engagement with portions of the automobile to provide secure, but resilient, support adjacent said automobile.

Other and further objects of the instant invention will be pointed out, or will become apparent, in connection with the description of a preferred embodiment of said invention described hereafter.

In the accompanying drawings:

FIGURE 1 is a perspective of a preferred embodiment of my invention when properly engaged with and extending from the top side portions of an automobile;

FIGURE 2 is a section taken along line 2—2 of FIGURE 1;

FIGURE 3 is a section taken along line 3—3 of FIGURE 1;

FIGURE 4 is a top view of the adjacent support assembly of the preferred embodiment of FIGURE 1;

FIGURE 5 is a top view of the outboard support assembly of the embodiment of FIGURE 1;

FIGURE 6 is a section taken along line 6—6 of FIGURE 4;

FIGURE 7 is a perspective of the spring-biased retractable gripping assembly of the embodiment of FIGURE 1;

FIGURE 8 is a section taken along line 8—8 of FIGURE 7;

FIGURE 9 is a top view illustrating the detail of a spacing strut used in the embodiment of FIGURE 1;

FIGURE 10 is a perspective illustrating the engageable part of the spacing strut of FIGURE 9 with an arm of the structure illustrated in FIGURE 1; and FIGURE 11 is a sectional view taken along the line 11—11 of FIGURE 2.

In FIGURE 1, a preferred embodiment of the instant invention is illustrated in its functional, assembled position. Therein, my support frame, indicated generally at 13, is shown attached to and extending from the left top extremity of the automobile 14.

In describing directions and the orientation of parts hereinafter, the directional nomenclature adopted will be consistent with the position of the parts when in their normal assembled position alongside, and extending from, an automobile, as shown in FIGURE 1. Hence the words "top," "side," "front," and "rear" and the like, will be used in the relative sense, relating to the normal sense given those terms when describing an automobile.

Considering first the major assemblies and components of my invention, as shown in FIGURE 1, support frame 13 consists of adjacent support assembly 15, outboard support assembly 17, front spacing strut 19, rear spacing strut 21, load bearing pads 23 and 25, and spring-biased retractable gripping assembly 27.

Adjacent axially aligned arms 29 and 31, of adjacent support assembly 15, and outboard axially aligned arms 33 and 35, of outboard support assembly 17, are interconnected by support beam 37. Beam 37 consists of rectangular rod 39, a part of support assembly 15, and rectangular tube 41, a part of support assembly 17, which are in telescopic engagement with rod 39 riding within tube 41. The front ends of arms 29 and 33, and the rear ends of arms 31 and 35 are joined by front and rear spacing struts 19 and 21, respectively. Vertical column 43, of outboard frame assembly 17, extends downwardly from the bracket 45 within which the ends of arms 33 and 35 are encased and supported, to rest upon the ground or other convenient base means.

Support and vertical spacing adjacent the automobile are provided by engagement of the frame with the automobile itself, by means of the cooperation of load bearing pads 23 and 25, and spring-biased retactable gripping assembly 27 with certain portions of the automobile, namely, the top 47 and the side gutter 49.

It is thus seen that FIGURE 1 illustrates a horizontally disposed, structural frame, extending from the side extremity of an automobile top, resiliently, but securely engaged thereto on the adjacent side of the frame, and supported by a column on the outboard side.

Now turning to a more detailed consideration of the major assemblies and parts, attention is first directed to FIGURE 4, wherein adjacent support assembly 15 is illustrated, with load bearing pads 23 and 25 connected thereto. Adjacent support assembly 15 consists of arms 29 and 31, rectangular rod 39, and bracket 51. As can be seen in FIGURE 2, bracket 51 is generally U-shaped, having top and bottom flat plate portions 52 and 53, each generally semi-octagonal in plan view, which are interconnected by curved edge 54. The spacing between the top plate 52 and bottom plate 53 is sufficient to permit the clearance of arms 29 and 31 and of rectangular rod 39. Bracket 51 defines a casing to support the ends of these members. Adjacent its rear end, rod 29 is pivotally engaged and retained within 51 by means of bolt 55. In like manner, the front end of arm 31 is pivotally engaged and retained within the cavity of bracket 51 by means of bolt 56. Rectangular rod 39 is held in fixed extended position with its inner end supported within the cavity of bracket 51 by bolts 57 and 59. As seen in FIGURE 4, arms 29 and 31 are folded inwardly into generally parallel relationship and lie on either side of, and in approximately the same plane as, rectangular rod 39. Rods 29 and 31 may be oppositely pivoted into the position illustrated in FIGURE 1 and FIGURE 2. It will noted that bolts 61 and 63, passing vertically through the front and rear portions of plates 52 and 53 of bracket 51, serve as stops to limit rotation of the arms 29 and 31. Thus extended, arms 29 and 31 are in axial alignment. It will be apparent that rectangular rod 39 will remain trapped in its position, perpendicular to the extended position of arms 29 and 31, since it has two points of restraint, i.e., by bolts 57 and 59.

It will be noted that a cylindrical detent 65 extends from the central portion of the upper surface of rectangular rod 39 at a point relatively close to the free end of said rod. As is shown in FIGURE 2, rod 39 contains a cavity 66 therein, generally rectangular in shape, within which is disposed wishbone shaped spring 67. The upper end of spring 67 is fixed to the bottom portion of cylindrical detent 65 which, in turn, passes through aperture 69 in the wall of rod 39. The surfaces defining this aperture serve as guide means for detent 65, while at the same time restraining the motion of detent 65 in a direction parallel to the axis of rod 39. If desired, restraining means can be provided for the bottom portion of wishbone spring 67, such as welding or otherwise securing the end of 67 opposite detent 65 to the inner surfaces of rod 39; however, the detent's engagement in aperture 69, in conjunction with a slight compressive loading of spring 67 in cavity 66, is normally sufficient to hold the detent and spring in place.

Cylindrical shaft 71 extends outwardly in either direction from the front and rear of U-shaped bracket 51. It is carried against the curved surface of the edge 54, being restrained thereagainst by bolts 61 and 63. It is aligned perpendicular to rod 39 and generally parallel to the extended positions of arms 29 and 31. Journalized on the extending ends of shaft 71, are curved pads 23 and 25, which are identical. As shown in FIGURE 6, pad 25 is U-shaped in cross section. It has aligned circular openings 72 through its opposite parallel sides which receive the end of shaft 71. Pads 23 and 25 are rotatable about shaft 71.

Rectangular slot 73 is formed in the central portion top plate 52 and, aligned below it, is a similar slot 75 in the bottom plate 53. Aligned rectangular slots 77 and 79 are provided in upper and lower walls of rod 39. Thus, a rectangular passage, of the size of slot 73, is provided through bracket 51, including the portion of rod 39 underlying 73.

Outboard support assembly 17 is illustrated in FIGURE 5. It consists of outboard arms 33 and 35, rectangular tube 41, and column 43, which are all carried by outboard bracket 45. Outboard bracket 45 is quite similar in shape to bracket 51, being U-shaped with congruent upper and lower plate portions 80 and 81 of generally semi-octagonal shape, joined and spaced by vertical edge 82. Arms 33 and 35, which are shown in their folded positions in FIGURE 5, are pivotally carried within the casing defined by bracket 45 by means of bolts 83 and 84. Bolts 85 and 87 secure hollow rectangular tube 41 in fixed position with its outboard end portion within the casing of bracket 45 and with its axis aligned generally perpendicular to the extended positions of arms 33 and 35. It will be apparent that the inner surface of edge 82 of bracket 45 restrains further rotation of arms 33 and 35 beyond the axially aligned position.

As is best seen in FIGURE 2, a bent tab member 91 is joined to the bottom central portion of outboard bracket 45 by means of bolt 87. Bent tab 91 is U-shaped, providing horizontally aligned ear portions 93 and 95 (FIGURE 11) through which a horizontally disposed bolt 97 extends. Bolt 97 serves as a pivot for column 43 which is suspended near its upper end from the shank of said bolt and straddled by the opposite tabs 93 and 95.

Column 43 consists of upper tubular member 99 and lower slidable tubular leg 100. Adjacent the upper end of 100, within its rectangular bore, is carried a washbone-shaped spring 101 (see FIGURE 2), one end of which has attached thereto a detent 102. The other end of said spring is in compressive engagement of the inner adjacent surfaces of 100. Cylindrical detent 102 extends through a suitable guide aperture 103 in the wall of leg 100, relatively close to its upper extremity. Vertically spaced locking apertures 104, 105, and 106 pass through the wall of tubular member 99. The diameter of said apertures is sufficient to recive cylindrical detent 102. It will thus be apparent that the slidable leg 100 may be engaged in fixed position with the detent 102 in any one of the locking apertures 104, 105, or 106. To change the position of the leg 100 with respect to tubular member 99, within which 100 slides, it is only necessary to depress detent 102 while applying simultaneously a small axial force along 100. When detent 102 is depressed sufficiently to permit the edge of the detent to clear the inner wall of 99, then leg 100 may be telescoped inwardly, or outwardly, as the case may be. Since tubular member 99 and leg 100 are rectangular in cross section, it is assured that the path of the detent, as the leg moves inwardly or outwardly, will follow a straight line. When sufficient movement of the lower leg has occurred, the detent will be aligned to spring into the first of the locking apertures 104, 105, or 106, that it encounters.

As seen in FIGURE 5, column 43 is pivoted into folded horizontal position wherein it is generally parallel to, and partially underlies, rectangular tube 41. In that position, lower leg 100 is telescoped into tubular member 99 as far as it will go.

Spring-biased retractable gripping assembly 27 is illustrated in FIGURE 7. It consists of lower clamp piece 109 having spaced parallel tabs 111 and 113 joined to the upper central portion thereof, stud 114, spring 115 and compression nut 117. Stud 114 is pivoted on bolt 119, which passes through tabs 111 and 113. The lower portion of stud 114 is rectangular, being shaped to slide within the opening through bracket 51 defined by rectangular slots 73, 75, 77, and 79. The upper end of stud 114 is cylindrical and is threaded to receive compression nut 117. Spring 115 is carried on stud 114, its upper end being contacted by compression nut 117 when assembly 27 is engaged with assembly 15 in the manner in which they are intended to cooperate. This cooperative relationship can best be understood by reference to FIGURE 2, wherein it is observed that stud 114 passes through adjacent bracket 51 with its lower rectangular shank riding in the elongated rectangular passage defined by slots 73, 75, 77, and 79. Compression nut 117 exerts a downward force on compression spring 115, which, in turn reacts against said nut and the top plate 52. Stud 114 is pulled upwardly, holding movable clamp piece 109 in engagement with the underside of gutter 49. Movable clamp piece 109 has inwardly turned ends 121 and 123, which serve to grip the underside of the gutter by hooking under it. These ends are preferably turned upwardly somewhat so that they will meet the central body of 109, as viewed in cross section, at somewhat of an acute angle, as best seen in FIGURE 8. The lower intermediate portion of clamp piece 109, lying between turned ends 121 and 123, is bent outwardly to slope diagonally downward, thus defining stiffener 125.

Spacing struts 19 and 21 are each identical. As seen in FIGURES 3 and 9, strut 19 consists of a tubular member 131 in which tubular member 133 of reduced diameter slides. Wishbone spring 135 disposed in the bore of 133 near its engaged end, carries a detent 137 on one end, the other end being in engagement with the inner wall of 133. Detent 137 rides in guide aperture 139 through the side of the upper wall of 133 and presses against the adjacent surfaces of tube 131. When the tubular members 131 and 133 are pulled apart a sufficient distance, the detent moves clear of the end of tube 131 and springs out to serve as a stop to resist retraction of the tube. The detent spring structure is quite similar to that explained in connection with the telescoping beam 37. If desired, intermediate position locking means could be provided to hold the strut locked in a desired telescoped relation by merely providing a locking aperture (or apertures) for tubular member 131 like those provided for upper tubular member 99 of telescoping vertical column 43. Likewise, provision for locking beam 37 in fixed telescoped relation may be made by providing similar apertures in rectangular tube 41.

Spacing struts 19 and 21 each have flattened outboard and adjacent ends 141 and 143, as is best shown in FIGURES 9 and 10. These ends engage aligned slots 145, cut horizontally across the walls of free ends of each of the tubular arms 29, 31, 33, and 35, the front strut 19 being so engaged with front arms 29 and 33, and the rear strut 21 with rear arms 31 and 35, as seen in FIGURE 1. The engaged struts prevent rotation of the arms toward the folded position.

To fully appreciate my invention, it is necessary to consider it in disassembled, mobile position and the preferred manner of manipulating the components from such mobile position to assemble the invention alongside, and supported by, an automobile.

In mobile position, assemblies 15 and 17 are engaged into a compact, elongated configuration. This is accomplished by telescoping rod 39 into rectangular tube 41 while the arms of each are unfolded in the axially aligned position. Detent 65 is depressed and the members 39 and 41 are pushed together as far as they will go. Arms 29 and 31 are then rotated together into folded position. Thereafter, arms 33 and 35 are rotated together until they lie generally parallel to and straddle folded arms 29 and 31. In this connection it is pointed out that the configuration of the assemblies permits this straddled relationship because of the spacing between arms 29 and 31 and between arms 33 and 35. Note that arms 29 and 31 have leeway to rotate inwardly, somewhat, with their axes inclined toward each other at their free ends. The spacing between arm 29 and rod 39, and between arm 31 and rod 39, is shown in FIGURE 4, and indicates the extent to which their ends may be turned together.

The folded, telescoped, compact unit which results from the above-described operations may then be stored, if desired, in a relatively small box which also may contain spacing struts 19 and 21 and the clamping parts.

To assemble the support structure alongside an automobile, the clamping means are relatively loosely engaged prior to unfolding the arms or support columns. This is accomplished by fitting pads 23 and 25 on the ends of shaft 71, engaging these pads with the top of an automobile at its side extremity by laying them thereagainst; and rotating nut 117 to tighten clamp piece 109, installed as shown in FIGURES 1 and 2, with its turned ends 121 and 123 in engagement with the underside of car gutter 121.

Engaged as described, the spring, now under compression, forces the adjacent bracket 51 downwardly by rotative action with respect to pads 23 and 25. The beam 37 is consequently forced to a position wherein it is downwardly inclined in the outboard direction. To complete assembly, the beam 41 together with the other extending components, is pulled upwardly and column 43 is rotated into the generally vertical position and telescoped to extend it to the desired height, the end, of course, bearing against the ground or other convenient base means. It is pointed out that the raising of the extending beam structure, as described, further compresses the spring 115 and tightens the grasp of the clamping piece 109 on the automobile gutter 49. Note that the rectangular opening defined by slots 73, 75, 77, and 79 permits movement of the shank 114 therein, thus permitting the rotation of the bracket with respect to the shank.

Outboard arms 33 and 35 and adjacent arms 29 and 31 are rotated into their respective axially aligned positions. The struts 19 and 21 are inserted with their flattened ends 141 and 143, respectively, engaged in the notches 145 in the ends of the arms 29, 31, 33, and 35, as previously described.

A cloth canopy or awning may be installed on the structural support if desired, although the support is adapted to carry a multiplicity of other desired objects or coverings. FIGURE 1 illustrates such a canopy 147. It has channels 149, shown in cross section in FIGURE 3, running across it on the front and rear. Such channels 149 are each formed by stitching or otherwise joining an elongated piece of material 151 to the underside of the material of 149 at joints 153 and 155. The canopy may have like channels along its side portions designed to ride over the arms 29, 31, 33, and 35, or cloth straps having snaps or any other suitable attachment means may be used to join the canopy to these areas, if desired.

It is pointed out that an advantage of the instant invention is the wide range of adjustability it permits because of the previously described means that bear against and clamp to the peripheral structure of the automobile or other object from which the invention is extended. Thus, the curved pads 23 and 25 are rotatable into any position about shaft 71 and the spring-biased rectractable gripping assembly 27 with its pivoted clamp piece 109 can assume a variety of positions and spacings with respect to each other. This allows the same structure to be used on a variety of automobiles, for example.

It is desirable, although not essential, that the surfaces of pads 23 and 25 be made of or coated with some material which will not tend to damage the finish of the automobile top portion which they are designed to contact. Likewise, the members 121 and 123, and the adjacent surfaces of movable clamp piece 109, for that matter, are desirably made out of a material which will not damage the gutter or other parts which are engaged. An acceptable method of making the parts just named suitable for engagement with the automobile's structure is to apply a light coat of vinyl plastic over the surfaces of the engaging parts. This may be accomplished, in conventional manner, by simply dipping the parts in a vinyl solution and allowing the plastic to cure thereon. As illustrated in FIGURES 6 and 8, respectivley, the finished parts will have thin plastic coatings 161 and 163.

While almost any type of construction materials may be used for the various portions of the invention described herein, I prefer that the structure members be made out of aluminum because of their light weight, and, hence, increased ease of portability.

While beam 37, with its telescoping parts, including rod 39 and tube 41, may be circular in cross section, I prefer that a shape be used which will prevent the rotation of 39 with respect to 41. The embodiment described illustrates a rectangular cross section to serve this purpose, but any type section which does not permit such rotation will suffice. It is advantageous that this rotation be restrained in order that the arms will tend to remain in a horizontal plane.

It is thus seen that the embodiment of the instant invention just described provides a frame supported from an automobile by resilient clamping means, including bearing means for resting on the top side surfaces of an automobile and a hook for engaging the gutter of said automobile below, but closely adjacent to, the point of contact of the bearing means on said top surfaces. The frame described has a support on its outboard side, that is, the side opposite the bearing means. The clamping means are resiliently coupled and are connected to the frame so that as it is raised to the height of the outboard support, a force is applied downwardly to said support to hold it in place.

Having described the invention in connection with certain specific embodiments thereof, it is to be understood that further modifications may now suggest themselves to those skilled in the art and it is intended to cover such modifications as fall within the scope of the appended claims.

What is claimed is:

1. An auto awning support which comprises:
   (a) a hook for engaging the gutter along one side of said auto;
   (b) a frame including a bearing means for resting on the roof of said auto above the point of engagement by said hook;
   (c) a support for said frame on the side thereof opposite said bearing means; and
   (d) resilient coupling means interconnecting said hook and said frame for forcing said hook and frame toward one another as the side of said frame opposite said auto is raised to the height of said support.

2. A detachable support frame, engageable with and extendible outwardly from the top side portion of a vehicle comprising:
   (a) a generally horizontal support having outboard and adjacent extremities;
   (b) a column extending downwardly from said support, spaced outwardly from the adjacent extremity of said support to provide outboard support;
   (c) a vehicle engageable adjacent support means for said horinontal support to provide adjacent support therefor, said support means being adaptable to engage top side portions of said vehicle, said support means comprising:
      (1) a clamping plate;
      (2) a movable gripping member, retractable with respect to said plate; and
      (3) biasing means, normally biasing said movable gripping member toward said plate.

3. The detachable support frame of claim 2 wherien said horizontal support comprises a horizontal beam extending outwardly from said adjacent support means.

4. The detachable support frame of claim 3 wherein said clamping plate is pivotally carried by a bracket and said gripping member is supported by a member extending from said bracket, said biasing means comprising a spring which biases said member with respect to said bracket.

5. The detachable support frame of claim 4 further comprising column height adjustment means and an outboard bracket, said column being pivotally connected to said outboard bracket to permit the rotation of said column in a vertical plane from a vertical position to a horizontal position, and wherein said beam comprises a pair of telescopic members permitting extension and retraction of said beam, one of said telescopic members being joined to said outboard bracket.

6. The detachable support frame of claim 5 further comprising a pair of elongated outboard arms pivotally carried adjacent each of their ends by said outboard bracket, said arms being foldable in a generally horizontal plane from a position axially transverse to said beam to a position alongside said beam, and a pair of elongated inboard arms pivotally carried adjacent each of their ends by the said bracket carrying said clamping plate, said arms being foldable in a generally horizontal plane from a position axially transverse to said beam to a position alongside said beam; whereby said detachable support frame is made compact when not in use by folding said outboard and inboard arms and by pivoting said column into the horizontal position.

7. A structural support engageable with and extendible outwardly from a convenient object having elevated opposed load-bearing surfaces comprising:
   (a) adjacent support means comprising:
      (1) a clamping plate;
      (2) a movable gripping member, retractable with respect to said plate;
      (3) biasing means, normallyb iasing said movable gripping member toward said plate; and
   (b) means including a bracket and a beam extending outwardly from said adjacent support means, said beam being connected to said bracket and being normally biased downwardly by said biasing means.

8. The structure of claim 7 further comprising adjustable outboard support means for said beam whereby the outer portion of said beam may be supported at an elevated level against the action of said biasing means.

9. A detachable support structure engageable with and extendible outwardly from the top side portions of a vehicle comprising:
   (a) an adjacent support assembly having a pair of pivotally mounted arms, coaxially aligned when in the assembled position, but pivotable into a folded position with said arms generally side by side;
   (b) an outboard support assembly having a pair of pivotally mounted arms coaxially aligned when in the assembled position, but pivotable into a folded position with said arms generally side by side;
   (c) the said adjacent assembly and outboard assembly being telescopically engageable by a retractable beam, supported on one of its ends by one of said assemblies and on its other end by the the other of said assemblies;
   (d) clamping means extending from said adjacent assembly and adaptable to engage structure of a vehicle; and
   (e) a column pivotally carried by said outboard assembly and rotatable from a generally vertical assembled position to a generally horizontal folded position
whereby said structure may be folded for convenience of carrying and storage when not in use, but assembled to provide a horizontal support frame adjacent to said vehicle when said clamping means is clamped thereto, and said arms and column are in the assembled position.

10. Auxiliary support structure engageable with and extendible from the top side portion of a vehicle comprising:
   (a) a pair of elongated spaced horizontally disposed and generally parallel supports;
   (b) a pair of members connecting adjacent ends of said supports;
   (c) a generally horizontal beam extending perpendicularly between said supports and mechanically interconnecting them;
   (d) a generally vertical leg extending downwardly from one of said supports and adapted to rest with its free end on base support means; and
   (e) a spring-biased clamp means pivotally connected to the other of said support means, said clamp, including a pair of plates and retractable gripping means.

11. A disengageable support for load bearing attachment with the top side portion of an automobile comprising:
   (a) outwardly extending beam means; and (b) adjacent support means connected to said beam means for engagement with said automobile comprising:
(1) curved load bearing plate means adapted to bear against the top side surfaces of said automobile; and
(2) a retractable gripper associated with said plate means, adapted for hooking engagement with the gutter of said automobile;
(c) said beam receiving mechanical support from said automobile only through said adjacent support means.

12. A horizontal framework having:
(a) a retractable leg; and
(b) peripheral structure engaging means adjacent the inside edge of said framework for applying a load to force said leg in firm contact with the surface upon which it rests while said peripheral structure engaging means tightly engage elevated peripheral structure, said leg being spaced outwardly therefrom, said peripheral structure engaging means comprising:
(1) a U-shaped bracket having an elongated shank passage formed therein, defining a vertical opening therethrough;
(2) a shank extending through said passage;
(3) a coiled spring carried on said shank above said bracket;
(4) upper stop means on said shank engageable with the upper portion of said spring;
(5) a gripper pivotally mounted to said shank adjacent its lower end and under said bracket; and
(6) a curved bearing pad rotatably engaged to said bracket and spaced upwardly above said gripper.

13. The detachable support frame of claim 2 further comprising tightening means for increasing the bias of said biasing means.

14. A support which comprises:
(a) gripping means for engaging one side of elevated structure which has generally oppositely disposed engageable portions,
(b) a frame including bearing means for engaging the portion of said elevated structure opposite to that engaged by said gripping means,
(c) a leg connected to said frame and spaced outwardly from said hook means, and
(d) resilient coupling means interconnecting said hook and said frame for forcing said leg downwardly into firm bearing relationship with the surface upon which it rests when said hook and said bearing means are engaged with the generally oppositely disposed engageable portions of said elevated structure.

References Cited by the Examiner

FOREIGN PATENTS 539,544  9/41  Great Britain.

HARRISON R. MOSELEY, *Primary Examiner.*